(12) United States Patent
Fronte et al.

(10) Patent No.: US 11,258,579 B2
(45) Date of Patent: *Feb. 22, 2022

(54) METHOD AND CIRCUIT FOR IMPLEMENTING A SUBSTITUTION TABLE

(71) Applicant: STMICROELECTRONICS (ROUSSET) SAS, Rousset (FR)

(72) Inventors: Daniele Fronte, Rousset (FR); Yanis Linge, Fuveau (FR); Thomas Ordas, Pourciux (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 381 days.

This patent is subject to a terminal disclaimer.

(21) Appl. No.: 16/281,887

(22) Filed: Feb. 21, 2019

(65) Prior Publication Data

US 2019/0268134 A1  Aug. 29, 2019

(30) Foreign Application Priority Data

Feb. 26, 2018 (FR) ....................................... 1851645

(51) Int. Cl.
*H04L 9/06* (2006.01)
*H04L 9/00* (2022.01)
(Continued)

(52) U.S. Cl.
CPC .............. *H04L 9/002* (2013.01); *G06F 21/72* (2013.01); *G09C 1/00* (2013.01); *H04L 9/003* (2013.01);
(Continued)

(58) Field of Classification Search
CPC ....... H04L 9/002; H04L 9/0822; H04L 9/003; H04L 9/14; H04L 9/0631; H04L 9/083;
(Continued)

(56) References Cited

U.S. PATENT DOCUMENTS 6,591,415 B1    7/2003 Torrubi
9,906,360 B2 *  2/2018 Johnson ................ H04L 9/0631
(Continued)

FOREIGN PATENT DOCUMENTS

CN    104378196 A  *  2/2015
CN    104734842 A  *  6/2015
(Continued)

OTHER PUBLICATIONS

Pan et al., "You Cannot Hide behind the Mask: Power Analysis on a Provably Secure S-Box Implementation," Information Security Applications: 10th International Workshop, Busan, South Korea, Aug. 25-27, 2009, pp. 178-192.
(Continued)

*Primary Examiner* — David Garcia Cervetti

(74) *Attorney, Agent, or Firm* — Seed IP Law Group LLP

(57) ABSTRACT

A cryptographic circuit performs a substitution operation of a cryptographic algorithm based on a scrambled substitution table. For each set of one or more substitution operations of the cryptographic algorithm, the circuit performs a series of sets of one or more substitution operations of which: one is a real set of one or more substitution operations defined by the cryptographic algorithm, the real set of one or more substitution operations being based on input data modified by a real scrambling key; and one or more others are dummy sets of one or more substitution operations, each dummy set of one or more dummy substitution operations being based on input data modified by a different false scrambling key.

25 Claims, 5 Drawing Sheets

(51) Int. Cl.
*G06F 21/72* (2013.01)
*G09C 1/00* (2006.01)

(52) U.S. Cl.
CPC ...... *H04L 9/0631* (2013.01); *H04L 2209/043* (2013.01); *H04L 2209/08* (2013.01); *H04L 2209/12* (2013.01); *H04L 2209/16* (2013.01)

(58) Field of Classification Search
CPC ... H04L 9/0869; H04L 9/0861; H04L 9/0894; H04L 9/88; H04L 9/0618; H04L 9/0625; H04L 9/0891; H04L 9/0662; H04L 2209/125; H04L 2209/08; H04L 2209/24; H04L 2209/12; H04L 2209/60; H04L 2209/16; G09C 1/00; G06F 21/72; G06F 21/602
See application file for complete search history.

(56) References Cited

U.S. PATENT DOCUMENTS

| | | | | |
|---|---|---|---|---|
| 10,243,728 | B2* | 3/2019 | Bruneau | H04L 9/0631 |
| 2003/0190155 | A1* | 10/2003 | Tsutsui | G11B 20/00086 |
| | | | | 386/268 |
| 2003/0223580 | A1* | 12/2003 | Snell | H04L 9/0631 |
| | | | | 380/28 |
| 2004/0193898 | A1* | 9/2004 | Ochi | H04L 9/003 |
| | | | | 713/189 |
| 2007/0263859 | A1* | 11/2007 | Teglia | H04L 9/003 |
| | | | | 380/29 |
| 2008/0019503 | A1* | 1/2008 | Dupaquis | H04L 9/002 |
| | | | | 380/28 |
| 2009/0055458 | A1* | 2/2009 | O'Neil | H04L 9/0618 |
| | | | | 708/400 |
| 2009/0074181 | A1 | 3/2009 | Pelletier | |
| 2009/0086976 | A1* | 4/2009 | Scian | H04L 9/003 |
| | | | | 380/277 |
| 2009/0113217 | A1* | 4/2009 | Dolgunov | H04L 9/0894 |
| | | | | 713/190 |
| 2009/0158051 | A1* | 6/2009 | Michiels | H04L 9/002 |
| | | | | 713/189 |
| 2011/0296198 | A1 | 12/2011 | Motoyama | |
| 2013/0064362 | A1* | 3/2013 | Tang | H04L 9/16 |
| | | | | 380/29 |
| 2014/0187202 | A1* | 7/2014 | Buck | H04W 12/08 |
| | | | | 455/411 |
| 2014/0351603 | A1 | 11/2014 | Feix et al. | |
| 2015/0270950 | A1* | 9/2015 | Michiels | H04L 9/002 |
| | | | | 380/28 |
| 2015/0286524 | A1* | 10/2015 | Trantham | G06F 11/108 |
| | | | | 714/766 |
| 2016/0065361 | A1* | 3/2016 | Choi | H04L 9/0631 |
| | | | | 380/287 |
| 2016/0182227 | A1* | 6/2016 | Michiels | H04L 9/06 |
| | | | | 380/28 |
| 2016/0261405 | A1* | 9/2016 | Chevallier-Mames | H04L 9/0631 |
| 2016/0269175 | A1* | 9/2016 | Cammarota | H04L 9/002 |
| 2016/0277180 | A1* | 9/2016 | Wang | G09C 1/00 |
| 2016/0350520 | A1* | 12/2016 | Michiels | G06F 21/72 |
| 2017/0244551 | A1* | 8/2017 | Thiebauld De La Crouee | H04L 9/3247 |
| 2017/0244552 | A1* | 8/2017 | Thiebauld De La Crouee | G09C 1/00 |
| 2017/0373838 | A1* | 12/2017 | Wurcker | H04L 9/0631 |
| 2018/0331820 | A1* | 11/2018 | Rietman | H01L 23/5383 |
| 2018/0351743 | A1* | 12/2018 | Michiels | H04L 9/002 |
| 2019/0057228 | A1* | 2/2019 | Feix | G09C 1/00 |
| 2019/0116022 | A1* | 4/2019 | Kim | G01N 33/56972 |
| 2020/0004992 | A1* | 1/2020 | Chong | H04L 9/003 |
| 2020/0092081 | A1* | 3/2020 | Rietman | H04L 9/002 |
| 2020/0125333 | A1* | 4/2020 | Vigilant | H04L 9/0631 |
| 2020/0177365 | A1* | 6/2020 | De Hoogh | H04L 9/0631 |
| 2020/0322127 | A1* | 10/2020 | Lozac'H | H04L 9/003 |
| 2021/0058228 | A1* | 2/2021 | Cioranesco | H04L 9/003 |

FOREIGN PATENT DOCUMENTS

| | | | | |
|---|---|---|---|---|
| CN | 104734845 | A * | 6/2015 | |
| CN | 107980212 | A * | 5/2018 | H04L 9/003 |
| EP | 3 188 000 | A1 | 7/2017 | |
| FR | 2 985 624 | A1 | 7/2019 | |

OTHER PUBLICATIONS

Yang et al., "Design Research of the DES against power analysis attacks based on FPGA," *Microprocessors and Microsystems* 35:18-22, 2011.
U.S. Appl. No. 16/281,881, filed Feb. 21, 2019, Method and Device for Performing Substitution Table Operations.
U.S. Appl. No. 16/281,889, filed Feb. 21, 2019, Method and Circuit for Performing a Substitution Operation.

* cited by examiner

METHOD AND CIRCUIT FOR IMPLEMENTING A SUBSTITUTION TABLE

BACKGROUND

Technical Field

The present disclosure relates to the field of electronic circuits, and in particular to a device and method for accessing substitution tables during a cryptographic operation.

Description of the Related Art

Substitution tables, also known as S-boxes, define a data substitution operation performed during cryptographic algorithms. The purpose of this data substitution is to obscure the relationship between the secret key and the cipher-text, and thus render it harder for the secret key to be discovered.

One technique used by hackers wishing to recover the secret key processed by a cryptographic device is to monitor signals on side channels in order to extract certain information relating, for example, to the power consumption or the timing in the device during the execution of a cryptographic algorithm. The manipulation of the secret key during substitution operations is often targeted by hackers using side channel methods due to the relative visibility of substitution operations.

Some solutions have been proposed providing a limited degree of protection against the use of side channel methods.

BRIEF SUMMARY

In an embodiment, a method comprises: executing, using a cryptographic circuit, substitution operations of a cryptographic process based on one or more scrambled substitution tables, the executing including: performing, for each set of one or more substitution operations of the cryptographic process, a series of sets of one or more substitution operations of which: one set of the series is a real set of one or more substitution operations defined by the cryptographic process, the real set of one or more substitution operations being based on input data modified by a real scrambling key; and one or more other sets of the series are dummy sets of one or more substitution operations, each dummy set of one or more dummy substitution operations being based on input data modified by respective false scrambling keys different from the real scrambling key. In an embodiment, a position of the real set of one or more substitution operations in each series is selected randomly based on a first random value. In an embodiment, the method comprises, for each series of sets of one or more substitution operations, storing respective output values of the series, and selecting an output value corresponding to said real set of one or more substitution operations based on said first random value. In an embodiment, each set of one or more substitution operations comprises addressing a memory location of a memory based on said modified input data and reading a data value at said memory location to provide an output data value. In an embodiment, the cryptographic process is based on a secret key; each series of sets of one or more substitution operations comprises m−1 dummy sets of one or more substitution operations, where m is an integer fixed at a value equal to or greater than 2, or selected randomly; and for a given key, a same group of false scrambling keys is applied during the corresponding m−1 dummy sets of one or more substitution operations. In an embodiment, performing each set of one or more substitution operations in said series comprises executing the cryptographic process based on a same input message and a same secret key. In an embodiment, different scrambling keys applied during each of said dummy sets of one or more substitution operations are selected randomly. In an embodiment, different scrambling keys applied during each of said dummy sets of one or more substitution operations are generated by a shift register receiving at its input the real scrambling key. In an embodiment, a number of dummy sets of one or more substitution operations performed in each series is selected randomly.

In an embodiment, a non-transitory computer-readable medium's contents cause a processing device to implement a method, the method comprising: executing substitution operations of a cryptographic process based on one or more scrambled substitution tables, the executing including: performing, for each set of one or more substitution operations of the cryptographic process, a series of sets of one or more substitution operations of which: one set of the series is a real set of one or more substitution operations defined by the cryptographic process, the real set of one or more substitution operations being based on input data modified by a real scrambling key; and one or more other sets of the series are dummy sets of one or more substitution operations, each dummy set of one or more dummy substitution operations being based on input data modified by respective false scrambling keys different from the real scrambling key. In an embodiment, a position of the real set of one or more substitution operations in each series is selected randomly based on a first random value. In an embodiment, the method comprises, for each series of sets of one or more substitution operations, storing respective output values of the series, and selecting an output value corresponding to said real set of one or more substitution operations based on said first random value. In an embodiment, each set of one or more substitution operations comprises addressing a memory location of a memory based on said modified input data and reading a data value at said memory location to provide an output data value. In an embodiment, the cryptographic process is based on a secret key; each series of sets of one or more substitution operations comprises m−1 dummy sets of one or more substitution operations, where m is an integer fixed at a value equal to or greater than 2, or selected randomly; and for a given key, a same group of false scrambling keys is applied during the corresponding m−1 dummy sets of one or more substitution operations. In an embodiment, different scrambling keys applied during each of said dummy sets of one or more substitution operations are selected randomly. In an embodiment, different scrambling keys applied during each of said dummy sets of one or more substitution operations are generated by a shift register receiving at its input the real scrambling key. In an embodiment, a number of dummy sets of one or more substitution operations performed in each series is selected randomly.

In an embodiment, A cryptographic device comprises: a memory circuit, which, in operation, stores one or more scrambled substitution tables to implement substitution operations of a cryptographic process; and one or more circuits, which, in operation, execute the cryptographic process, the executing including, for each set of one or more substitution operations of the cryptographic process, performing a series of sets of one or more substitution operations using a stored scrambled substitution table, each series of sets of one or more substitution operations comprising: a real set of one or more substitution operations defined by the cryptographic process, the real set of one or more substitution operations being based on input data modified by a real scrambling key; and one or more dummy sets of one or more substitution operations, each dummy set of one or more substitution operations being based on input data modified by respective false scrambling keys different from the real scrambling key. In an embodiment, the cryptographic device comprises a random number generator, which, in operation, generates, for each of said series of sets of one or more substitution operations, a random value, wherein the one or more circuits randomly select a position of the real substitution operation in the series based on the random value. In an embodiment, the cryptographic device comprises: an input register, which, in operation, stores an input value; a scrambler, which, in operation, modifies said input value based on a scrambling key; and a key generator, which, in operation, generates said scrambling key for each substitution operation of said series based on the random value and on the real scrambling key. In an embodiment, the key generator comprises a shift register, which, in operation, generates said scrambling key by shifting said real scrambling key. In an embodiment, the one or more circuits comprise one or more processing devices under control of instructions stored in an instruction memory to select, for each set of one or more substitution operations of each series, either to implement the real set of one or more substitution operations by modifying the input value using the real scrambling key, or to implement a dummy set of one or more substitution operations by modifying the input value using one of said false scrambling keys.

In an embodiment, a system comprises: one or more processing cores; and cryptographic circuitry coupled to the one or more processing cores, wherein the cryptographic circuitry, in operation, protects execution of a cryptographic process which uses a plurality of substitution tables, the protecting including performing, for each set of one or more substitution operations of the cryptographic process, a series of sets of one or more substitution operations of which: one set of the series is a real set of one or more substitution operations defined by the cryptographic process, the real set of one or more substitution operations being based on input data modified by a real scrambling key; and one or more other sets of the series are dummy sets of one or more substitution operations, each dummy set of one or more dummy substitution operations being based on input data modified by respective false scrambling keys different from the real scrambling key. In an embodiment, a position of the real set of substitution operations in each series is selected randomly based on a first random value. In an embodiment, the cryptographic process is related to a function of the one or more processing cores.

In an embodiment, a method comprises implementing, by a cryptographic circuit, a substitution operation of a cryptographic algorithm based on a scrambled substitution table. The method includes: performing, for each set of one or more substitution operations of the cryptographic algorithm, a series of sets of one or more substitution operations of which: one is a real set of one or more substitution operations defined by the cryptographic algorithm, the real set of one or more substitution operations being based on input data modified by a real scrambling key; and one or more others are dummy sets of one or more substitution operations, each dummy set of one or more dummy substitution operations being based on input data modified by a different false scrambling key.

According to one embodiment, the position of the real set of one or more substitution operations in each series is selected randomly based on a first random value.

According to one embodiment, the method further comprises, for each series of sets of one or more substitution operations, storing an output value, and selecting the output value corresponding to the real set of one or more substitution operations based on the random value.

According to one embodiment, each set of one or more substitution operations comprises addressing a memory location of a memory based on said modified input data and reading a data value at said memory location to provide an output data value.

According to one embodiment, the cryptographic algorithm is based on a secret key; each series of sets of one or more substitution operations comprises m−1 dummy sets of one or more substitution operations, where m is an integer fixed at a value equal to or greater than 2, or selected randomly; and for a given key, a same group of false scrambling keys is applied during the corresponding m−1 dummy sets of one or more substitution operations.

According to one embodiment, performing each set of one or more substitution operations in the series comprises executing the cryptographic algorithm based on a same input message and a same secret key.

According to one embodiment, the different scrambling keys applied during each of the dummy sets of one or more substitution operations are selected randomly.

According to one embodiment, the different scrambling keys applied during each of the dummy sets of one or more substitution operations are generated by a shift register receiving at its input the real scrambling key.

According to one embodiment, the number of dummy sets of one or more substitution operations performed in each series is selected randomly.

In an embodiment, a non-transitory storage medium stores a computer program configured, when executed by a processing device, to implement embodiments of one or more methods disclosed herein.

In an embodiment, a cryptographic circuit comprises: a memory circuit storing a scrambled substitution table for implementing substitution operations of a cryptographic algorithm; and one or more circuits configured to perform, for each set of one or more substitution operations of the cryptographic algorithm, a series of sets of one or more substitution operations using the scrambled substitution table, each series of sets of one or more substitution operations comprising: a real set of one or more substitution operations defined by the cryptographic algorithm, the real set of one or more substitution operations being based on input data modified by a real scrambling key; and one or more dummy sets of one or more substitution operations, each dummy set of one or more substitution operations being based on input data modified by a different false scrambling key.

According to one embodiment, the cryptographic device further comprises a random number generator configured to generate, for each of said series of sets of one or more substitution operations, a random value, the one or more circuits being configured to randomly select the position of the real substitution operation among the one or more dummy substitution operations based on the random value.

According to one embodiment, the cryptographic device further comprises: an input register configured to store an input value; a scrambler configured to modify the input value based on a scrambling key; and a key generator configured to generate the scrambling key for each substitution operation of the series based on the random value and on the real scrambling key.

According to one embodiment, the key generator comprises a shift register configured to generate the scrambling key by shifting the real scrambling key.

According to one embodiment, the one or more circuits comprise one or more processing devices under control of instructions stored in an instruction memory to select, for each set of one or more substitution operations of each series, either to implement the real set of one or more substitution operations by modifying the input value using the real scrambling key, or to implement a dummy set of one or more substitution operations by modifying the input value using one of the different false scrambling keys.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Figure 1:
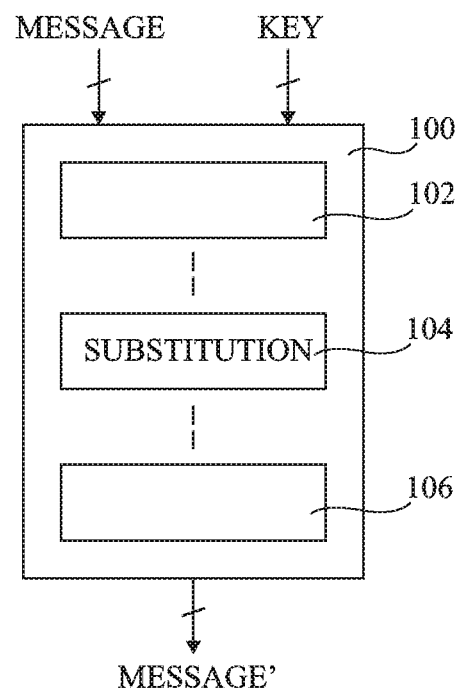
FIG. 1 schematically illustrates a circuit for executing a cryptographic algorithm involving substitution operations according to an example embodiment.

Throughout the present disclosure, the term "connected" is used to designate a direct electrical connection between circuit elements, whereas the term "coupled" is used to designate an electrical connection between circuit elements that may be direct, or may be via one or more intermediate elements such as multiplexers, buffers, etc.

Furthermore, throughout the present disclosure, the following terms will be considered to have the following definitions:

"cryptographic algorithm or process"—any series of operations performed by a device that involves the manipulation of a secret value, such as a secret key, which is to be hidden from the world outside the device. Examples of cryptographic algorithms include algorithms for encrypting or decrypting plaintext/cipher-text based on a secret key, for generating a message authentication code (MAC) or other form of digital signature based on a secret algorithm and/or key, or any other type of secretive operation;

"substitution operation" or "S-box access"—an operation of a cryptographic algorithm in which an output data value is generated based on an input data value using a substitution table, e.g., an S-box. The input and output values may have the same, or a different, number of bits. This operation is for example performed using a lookup table (LUT) stored in a memory, and the values defined in the lookup table may be fixed, or could be updated dynamically;

"set of one or more substitution operations"—this may correspond to a single S-box access, or to a plurality of substitution operations performed using one or more substitution tables, such as the substitution operations performed during one, some or all of the rounds of a cryptographic algorithm. For example, a set of substitution operations may correspond to all of the substitution operations performed during the execution of the DES algorithm, which involves multiple rounds;

"real set of one or more substitution operations"—one or more substitution operations defined by the cryptographic algorithm that is being executed, which are for example useful operations in that the result of the substitutions will contribute towards the calculation of the useful output data of the cryptographic algorithm;

"scrambled S-box"—an S-box in the form of a lookup table in which the entries have been permutated in order to make it harder to detect which S-box substitution is performed on each S-box access operation. For example, the S-box is scrambled such that in order to perform a given substitution operation defined by the cryptographic algorithm, the input data must first be modified based on a scrambling key, and the correct output data can be read from the scrambled S-box only by performing the access based on this modified input data. For example, in some embodiments the scrambling key has the same length as the input data, and the input data is modified by an XOR operation applied bit-by-bit between the scrambling key and the input data. Alternatively, other functions could be used to modify the input data based on the scrambling key;

"dummy set of one or more substitution operations"—fake or false substitution operations performed in the same manner as real substitution operations, but which are superfluous as they are performed in addition to the real substitution operations defined by the cryptographic algorithm. While the result of each set of one or more dummy substitution operations may be stored to memory, it is not useful in that the result serves no purpose in relation with the cryptographic algorithm and can be discarded. As described herein, the dummy substitution operations are for example performed, when addressing a memory storing a scrambled S-box, based on input data that has been modified using a false scrambling key.

FIG. 1 schematically illustrates a cryptographic circuit 100 according to an example embodiment. The circuit 100 for example receives as inputs a message (MESSAGE) to be processed and a secret key (KEY) of the cryptographic operation, which will also be referred to herein as the cryptographic key. For example, the message corresponds to plaintext to be encrypted by the circuit 100 using the secret key, to cipher-text to be decrypted by the circuit 100 using the secret key, or to data that is to be signed by the circuit 100 by generating a digital signature, such as a MAC (message authentication code) based on the key.

The circuit 100 comprises a series of hardware modules implementing the cryptographic algorithm involving various operations 102, 104, 106 applied to the message and key in order to generate an output message (MESSAGE') corresponding to cipher-text, plaintext and/or a digital signature. In the example of FIG. 1, the operation 104 corresponds to a substitution operation (SUBSTITUTION) involving one or more substitution tables.

Figure 2:
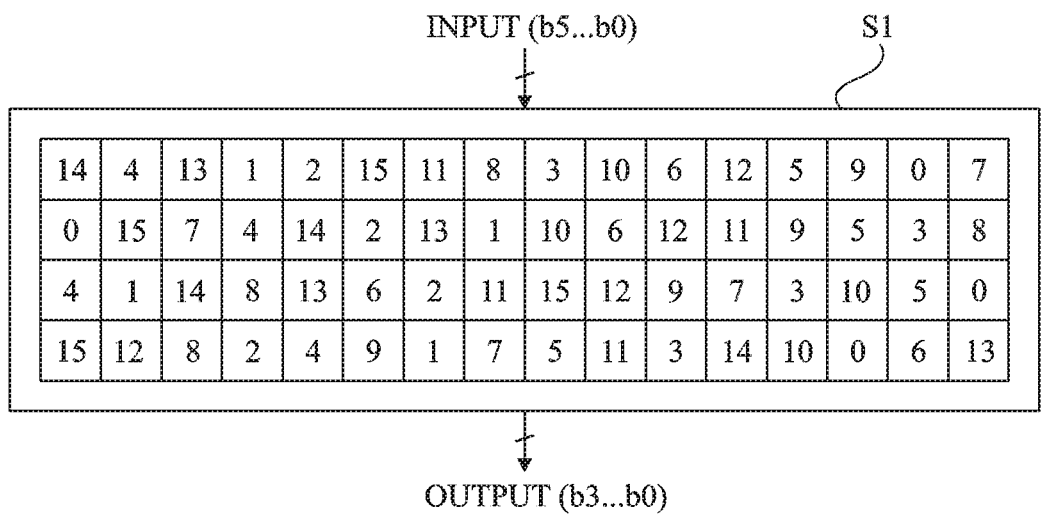
FIG. 2 schematically illustrates an S-box according to an example embodiment.

FIG. 2 schematically illustrates an example of an S-box used during the DES (data encryption standard) algorithm. As known to those skilled in the art, the DES encryption algorithm involves 8 S-boxes S1 to S8, each of which is unique. FIG. 2 illustrates the DES S-box S1.

An S-box access according to the DES encryption algorithm involves inputting 6 input bits (INPUT) b5 to b0, and outputting 4 output bits (OUTPUT) b3 to b0. The S-box S1 is in the form of a lookup table having 16 columns and 4 rows. The bits b5 and b0 of the input value are for example used to select a row of the table, and the bits b4 to b1 of the input value are for example used to select a column of the table. The 4-bit value stored in the selected row and column forms the output value of the S-box.

Of course FIG. 2 illustrates only one example of an S-box, and the principles described in the present disclosure could be applied to any type of S-box in which input data is substituted in order to generate output data based on a table of stored values.

Figure 3A:
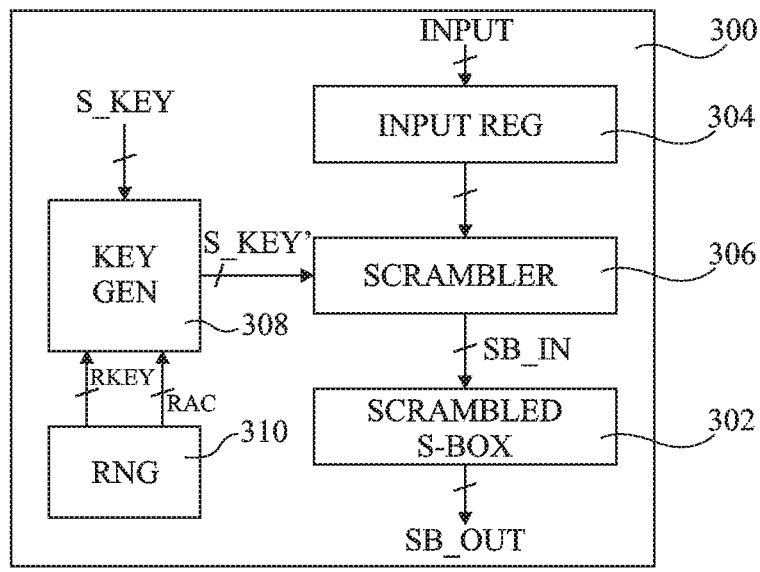
FIG. 3A schematically illustrates substitution circuit according to an example embodiment of the present disclosure.

FIG. 3A schematically illustrates a substitution circuit 300 for implementing S-box access operations according to an example embodiment of the present disclosure. The circuit 300 for example forms part of the circuit 100 of FIG. 1.

The circuit 300 comprises a scrambled S-box (SCRAMBLED S-BOX) 302 receiving input data SB_IN, and providing output data SB_OUT. The scrambled S-box 302 is for example implemented by a non-volatile memory, in which the input data SB_IN provides an address input to the memory, and the output data SB_OUT corresponds to the data value stored at the addressed location in the memory.

The scrambled S-box 302 for example corresponds to the S-box S1 of FIG. 2, in which a permutation has been applied to the memory locations based on a scrambling key. Alternatively, the scrambled S-box 302 could correspond to a scrambled version of any other S-box of the DES encryption standard or other encryption standard, such as an S-box used in the TDES (Triple DES), AES (advanced encryption standard) or SM4 (formerly known as SMS4) encryption standards.

The circuit 300 further comprises an input register (INPUT REG) 304 receiving an input value INPUT corresponding to a substitution operation to be performed in relation with a cryptographic algorithm. For example, the input value INPUT is the result of an operation performed on the message data and the key data of FIG. 1.

The circuit 300 further comprises a scrambler (SCRAMBLER) 306 that receives the input value from the input register 304, and generates modified input data to be provided as the input SB_IN to the scrambled S-box 302. In particular, the scrambler 306 modifies the input data based on a key S_KEY' provided by a key generator (KEY GEN) 308. The key generator 308 for example receives the real scrambling key S_KEY, and a random value RAC generated by a random number generator (RNG) 310. The random number generator 310 is for example a pseudo-random number generator or a true random number generator. In some embodiments, the key generator 308 also receives random key values RKEY from the random number generator 310.

In operation, each set of one or more substitution operations defined by the cryptographic algorithm is implemented, by the circuit of FIG. 3A, by a series of m sets of one or more S-box access operations, where m is for example an integer equal to two or more. Only one of the m sets of one or more S-box access operations corresponds to the real set of substitution operations of the cryptographic algorithm and uses the correct scrambling key S_KEY. The other m−1 sets of one or more access operations of each series correspond to dummy sets of substitution operations involving false scrambling keys S_KEY', which are for example each different from each other for a given series of S-box accesses.

For example, for each substitution operation to be performed using the S-box 302, the input data value INPUT is loaded into the input register 302, and processed m times by the scrambler 306 based on m different values of the scrambling key S_KEY' in order to generate m different modified S-box input values SB_IN provided to the S-box 302. The key generator 308 generates the keys S_KEY' based on the random value RAC generated by the random number generator 310, and in some embodiments based on the random key values RKEY.

For example, the value RAC comprises an r-bit value indicating the position of the real key S_KEY among the m−1 false keys, and thus indicates the position of the real set of one or more substitution operations among the m−1 dummy set of one or more substitution operations. For example, $2^r$ is equal to m. In one example, m is equal to 4, and r is equal to 2, where a value RAC of "00" indicates the first of the four substitution operations, and a value of RAC of "11" indicates the fourth of the four substitution operations.

In some embodiments, each of the m−1 false keys generated for a given series of sets of one or more S-box accesses is derived from the real key S_KEY. For example, each false key results from a function F applied to the real key S_KEY. In one embodiment, the function F is a shift operation. For example, the real key and three false keys could be as follows:

|  | KEY VALUE | Function F |
|---|---|---|
| RK | [01001110] | None |
| FK1 | [10011100] | Left shift by 1 |
| FK2 | [00111001] | Left shift by 2 |
| FK3 | [01110010] | Left shift by 3 | where RK is the real key S_KEY, and FK1, FK2 and FK3 are the false keys derived from the real key.

Alternatively, the false keys could be generated based on another function F applied to the real key S_KEY, or based on the random key values RKEY provided by the random number generator 310.

In some embodiments, for a given value k of the cryptographic key used during the cryptographic algorithm, the false scrambling keys applied during each of the m−1 sets of dummy access operations are fixed until the cryptographic key is changed.

Figure 3B:
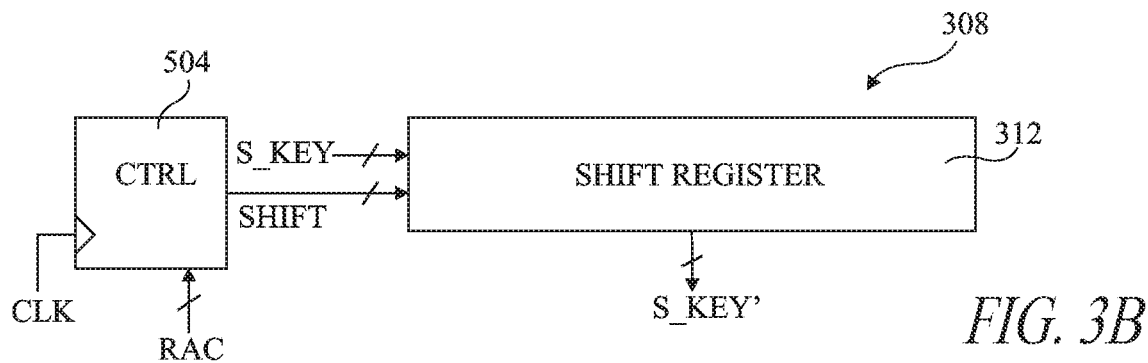
FIG. 3B schematically illustrates a scrambling key generator of the substitution circuit of FIG. 3A in more detail according to an example embodiment of the present disclosure.

FIG. 3B schematically illustrates the key generator 308 of FIG. 3A in more detail according to an example embodiment in which the false scrambling keys are generated by shifting the real scrambling key S_KEY.

The generator 308 for example comprises a shift register (SHIFT REGISTER) 312 receiving the real scrambling key S_KEY, and a shift select signal SHIFT indicating a shift to be applied to the key S_KEY. For example, the signal SHIFT indicates that no shift is to be applied when the real set of one or more access operations is to take place, and applies a left shift by a different number of bit positions for each of the false scrambling keys to be applied during the dummy set of access operations.

The key generator 308 also for example comprises a control circuit (CTRL) 504 generating the shift select signal SHIFT based on the value RAC provided by the random number generator 310. In particular, the control circuit 504 for example selects the position of the real scrambling key during each series of sets of S-box accesses based on the value RAC. The control circuit 504 for example receives a clock signal CLK indicating the period of each S-box access operation such that the shift selection signal SHIFT can be updated at the appropriate time.

According to one embodiment that will now be described with reference to FIGS. 4 and 5, each set of substitution operations corresponds to the substitution operations performed during the execution of a cryptographic algorithm based on a given message and key.

Figure 4:
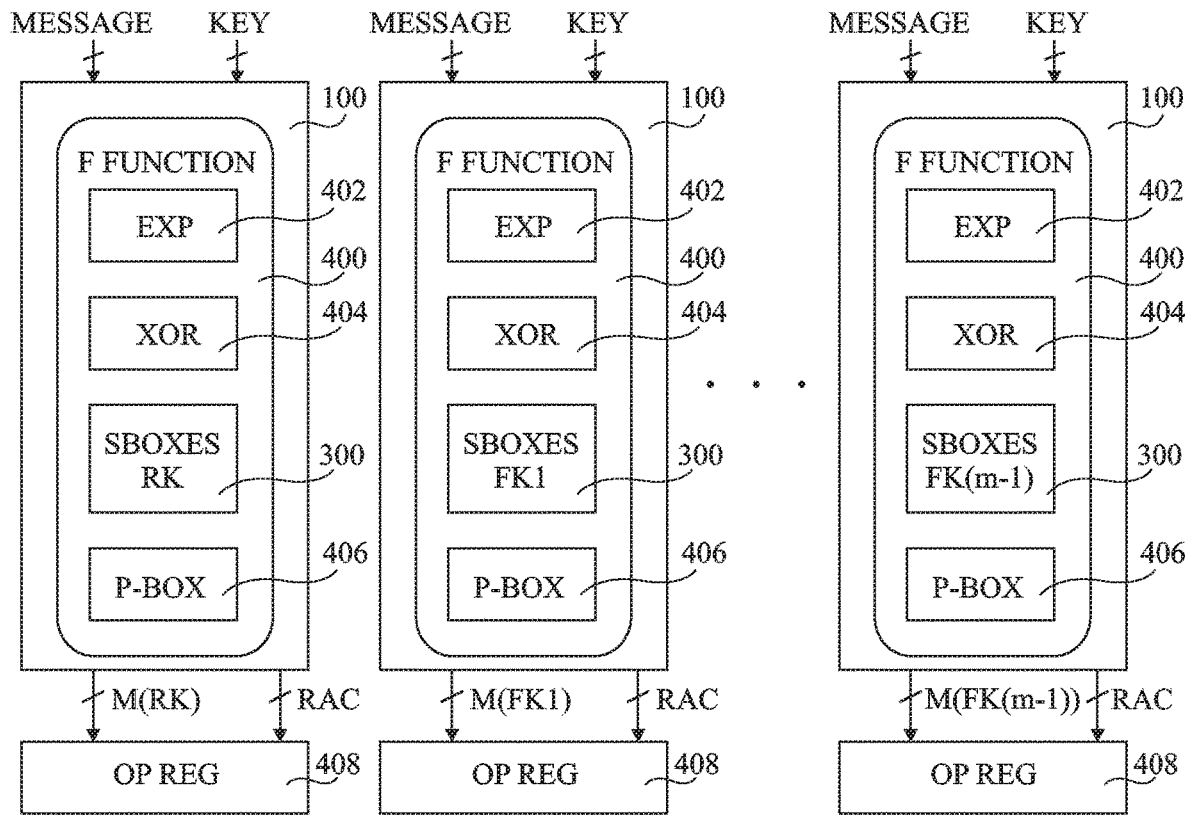
FIG. 4 schematically illustrates a circuit for executing a series of cryptographic operations according to an example embodiment of the present disclosure.

FIG. 4 illustrates the cryptographic circuit 100 of FIG. 1 in more detail for a series of m sets of substitution operations each corresponding to an execution of the DES algorithm based on a given message (MESSAGE) and key (KEY). The cryptographic circuit 100 for example comprises a circuit 400 (F FUNCTION) for executing a round function, each round for example comprising an expansion operation (EXP) performed by a circuit 402, an XOR operation (XOR) performed by a circuit 404 to introduce a round key, the substitution operation (S-BOXES) performed by the substitution circuit 300, and a permutation operation (P-BOX) performed by a circuit 406. The message M resulting from each execution of the DES algorithm is provided to an output register (OP REG) 408, along with the random value RAC.

The cryptographic circuit 100 is illustrated multiple times in FIG. 4 to represent the substitution operation performed during each of the series of m executions of the DES algorithm. One of these executions shown on the left in FIG. 4 is based on the real scrambling key (RK), whereas the other executions are respectively based on different false scrambling keys FK1 to FK(m−1). The order of the real and fake DES executions is selected randomly for each series of executions based on the randomly generated value RAC.

Figure 5:
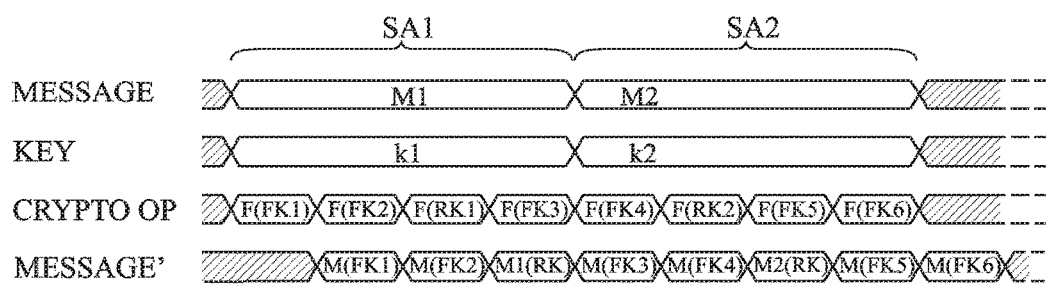
FIG. 5 is a timing diagram illustrating an example of signals in the circuit of FIG. 4.

FIG. 5 is a timing diagram representing an example of the inputs MESSAGE and KEY of the circuit 100 of FIG. 4, of the operations (CRYPTO OP) performed by the circuit 100, and of the output message (MESSAGE') generated during each execution.

A first series SA1 of DES executions is based on an input message M1 and on a cryptographic key k1 and a second series SA2 of DES executions is based on an input message M2 and on a cryptographic key k2. In the example of FIG. 4, the number m of DES executions in each series is fixed at four, although in alternative embodiments m could be any integer equal to 2 or more. The series SA1 for example comprises three fake DES executions F(FK1), F(FK2) and F(FK3) respectively based on false scrambling keys FK1, FK2 and FK3, and a real DES execution F(RK) based on the real scrambling key RK. The series SA2 for example comprises three fake DES executions F(FK4), F(FK5) and F(FK6) respectively based on false scrambling keys FK4, FK5 and FK6, and a real DES execution F(RK) based on the real scrambling key RK. The position of the real DES execution among the fake executions is randomly selected for each series of m executions, and is the third position in the series SA1 and the second position in the series SA2 in the example of FIG. 5.

In some embodiments, the group of fake scrambling keys in each series of sets of access operations is fixed for a given cryptographic key, and only the position of the real set of access operations varies between the series. Each time the cryptographic key changes, a new group of fake scrambling keys is for example selected.

The message MESSAGE' resulting from each execution of the cryptographic algorithm is for example output following the termination of each execution of the cryptographic algorithm, and these messages are for example labelled M(FK1) to M(FK6) in the case of the fake executions F(FK1) to F(FK6), and M1(RK) and M2(RK) in the case of the real executions. During each series of executions, all of the messages are for example stored to the output register 408, and the random value RAC is for example used to select only the real messages from the output register 408 to provide the result of the cryptographic algorithm.

Figure 6A:
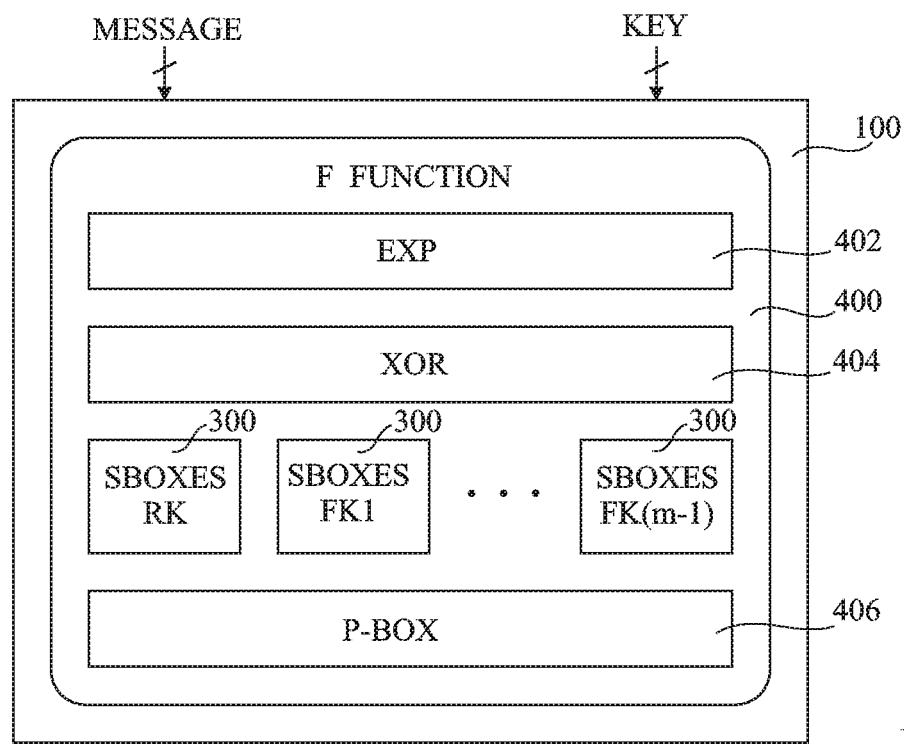
FIG. 6A schematically illustrates a circuit for executing a series of substitution operations according to a further example embodiment of the present disclosure.

FIG. 6A illustrates the cryptographic circuit 100 of FIG. 1 in more detail for a series of m substitution operations performed in place of a single substitution operation. The example of FIG. 6A is again based on the DES algorithm, and involves the same circuit 400 of FIG. 4. However, in the case of FIG. 6A, each time the substitution circuit 104 is called to apply a substitution operation within a given execution of the round function, a series of m substitution operations is performed.

The substitution circuit (S-BOXES) 300 is illustrated multiple times in FIG. 6A to represent the substitution operation performed during each of the series of m substitution operations. One of these substitution operations shown on the left in FIG. 6A is the real substitution operation based on the real scrambling key (RK), whereas the other substitution operations are respectively based on false scrambling keys FK1 to FK(m−1). The order of the real and fake substitution operations is selected randomly for each series of substitution operations based on the randomly generated value RAC.

Figure 6B:
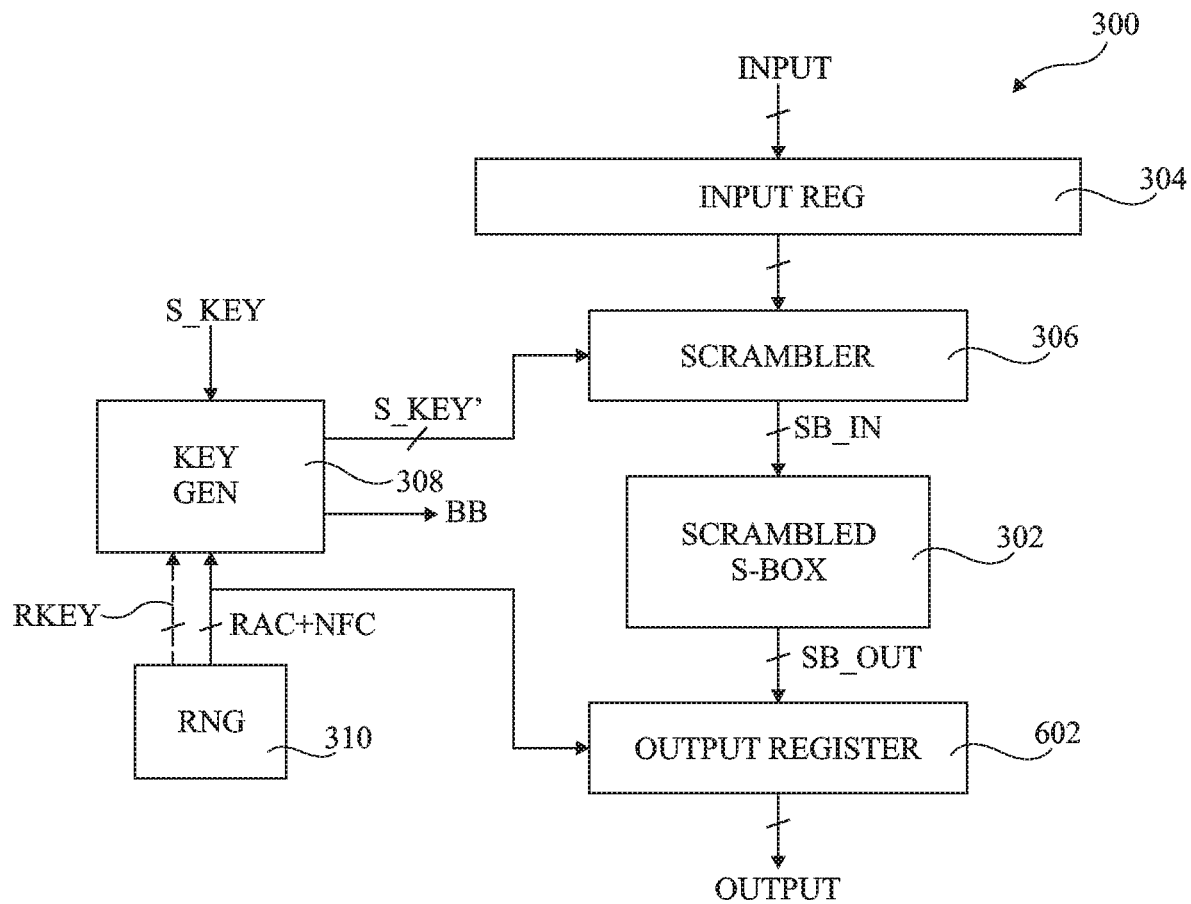
FIG. 6B schematically illustrates a substitution circuit of FIG. 6A in more detail according to an example embodiment of the present disclosure.

FIG. 6B illustrates the substitution circuit 300 of FIG. 3A in more detail according to an example embodiment. The circuit 300 of FIG. 6B is for example similar to that of FIG. 3A, and like features are labelled with like reference numerals and will not be described again in detail.

In the example of FIG. 6B, the number m−1 of false substitution operations is for example variable, and the random generator 308 for example generates, in addition to the value RAC, a value NFC indicating the number of false or dummy substitution operations to be applied to the current series of substitution operations. The key generator 308 for example generates a busy bit (BB) to indicate to a host system the periods during which the S-box is occupied.

Furthermore, in the example of FIG. 6B, the outputs of the scrambled S-box 302 are provided to an output register (OUTPUT REG) 602, which also for example receives the random values RAC and NFC from the random number generator 310.

In some embodiments, the value NFC may be fixed for a given key, while in other embodiments, this value is randomly generated for each series of substitution operations.

For example, in one embodiment, the value NFC is a 2-bit value, and the value RAC is a 3-bit value. The number m−1 of dummy S-box accesses in each series of S-box accesses is for example equal to:

$$m-1=2^{NFC}-1$$

Thus, with the value of NFC being equal to 0, 1, 2 or 3, the number m−1 of dummy S-box accesses can for example be 0, 1, 3 or 7. Furthermore, the value RAC is for example used to determine the position of the real access by performing a logic AND operation between the 3-bit binary value RAC and a 3-bit binary value FN representing the number m−1.

By randomly generating the value of NFC for each series of S-box accesses, the processing time for each real S-box access will be variable. Thus, as the duration of each S-box access is no longer predictable, the busy bit BB for example indicates to the host processing system the time periods during which the S-boxes 301 is occupied.

The output register 602 for example stores each of the output values SB_OUT from the scrambled S-box 302 during each of the substitution operations of each series. Furthermore, the circuit 602 for example selects the real set of output values to form the output value OUTPUT based on the values RAC and NFC.

Operation of the circuit of FIG. 6B will now be described in more detail with reference to FIG. 7.

Figure 7:
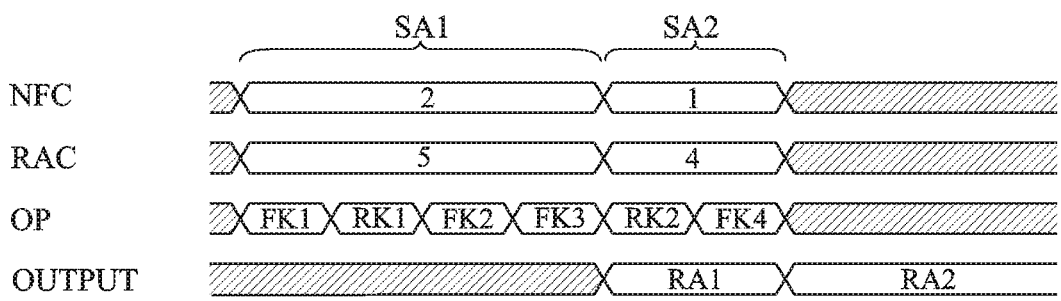
FIG. 7 is a timing diagram illustrating an example of signals in the circuit of FIG. 6B.

FIG. 7 is a timing diagram representing examples of the cryptographic key KEY used to generate the input data for each S-box access, the value RAC, the S-box access operations OP, and the output value OUTPUT during a series of accesses SA1 and SA2 using the circuit of FIG. 6B.

During the series of substitution operations SA1, the values of NFC and RAC are randomly generated to equal 2 and 5 respectively. Thus, based on the above equation, the number m−1 of dummy sets of one or more S-box operations in the series SA1 is equal to 3. The total number of sets of S-box accesses in any series is equal to m, and the result of the operation NF*RAC is for example a 3-bit value that may assume a value between 0 and NF, where 0 represents the first access of the series, and NF represents the last access of the series. Thus, in the example of the series of accesses SA1, the position of the real access operation is equal to a logic AND applied bit by bit to the values "011" and "101", which gives "001", corresponding to the second access of the series. Thus, in the example of the series of accesses SA1, the position of the real set of access operations is second, and the series SA1 of m access operations comprises, in sequence: a dummy access operation using a false scrambling key FK1; a real access operation RK1 using the real scrambling key; a dummy access operation using a false scrambling key FK2; and a dummy access operation using a false scrambling key FK3. After the last access operation, the output value OUTPUT becomes equal to the result of the real access operation RK1.

During the series of substitution operations SA2, the values of NFC and RAC are randomly generated to equal 1 and 4 respectively. Thus the number m−1 of dummy S-box operations in the series SA2 is equal to 1, and the position of the real access operation in the series SA2 is equal to a logic AND applied bit by bit to the values "001" and "100", which gives "000", corresponding to the first access of the series. Thus, in the example of the series of accesses SA2, the m access operations comprise, in sequence: a real access operation RK2 using the real scrambling key; and a dummy access operation using a random scrambling key FK4. After the last access operation, the output value OUTPUT becomes equal to the result of the real access operations RK2.

The examples of FIGS. 3A and 6A correspond to hardware implementations. In alternative embodiments, the method of performing an S-box access operation described herein could be implemented in software, as will now be described in more detail with reference to FIGS. 8 and 9.

Figure 8:
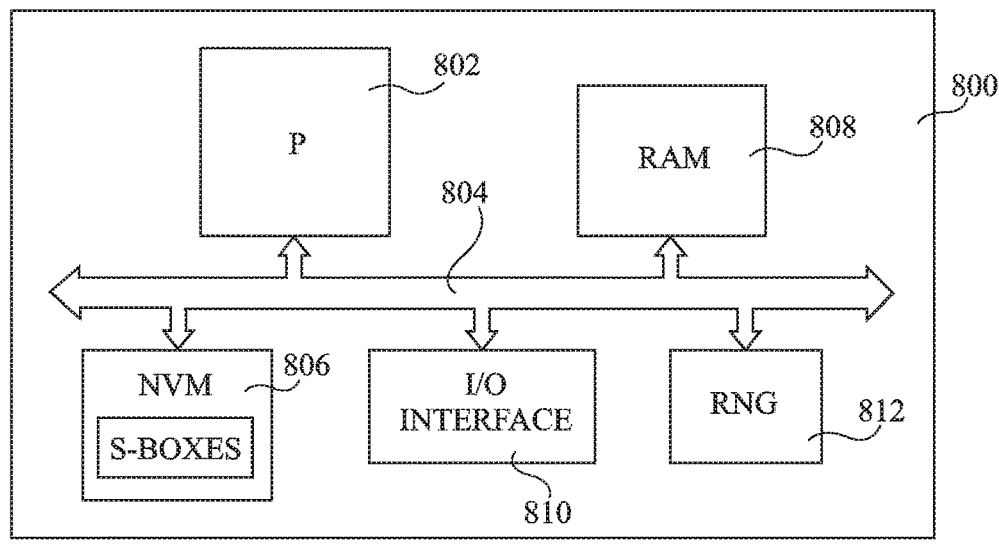
FIG. 8 schematically illustrates a processing system for performing S-box accesses according to an example embodiment of the present disclosure.

FIG. 8 schematically illustrates a processing system 800 according to an example embodiment of the present disclosure. The system 800 for example comprises a processing device (P) 802 coupled via a bus 804 to a memory 806 storing one or more S-boxes (S-BOXES). The memory 806 is for example a non-volatile memory (NVM). The system 800 also for example comprises, coupled to the bus 804, a volatile memory 808, which is for example a RAM (random access memory), an input/output interface (I/O INTERFACE) 810, and a random number generator (RNG) 812. The processing device 802 for example comprises one or more processing cores under control of instructions stored in an instruction memory, for example the memory 806 and/or 808.

Figure 9:
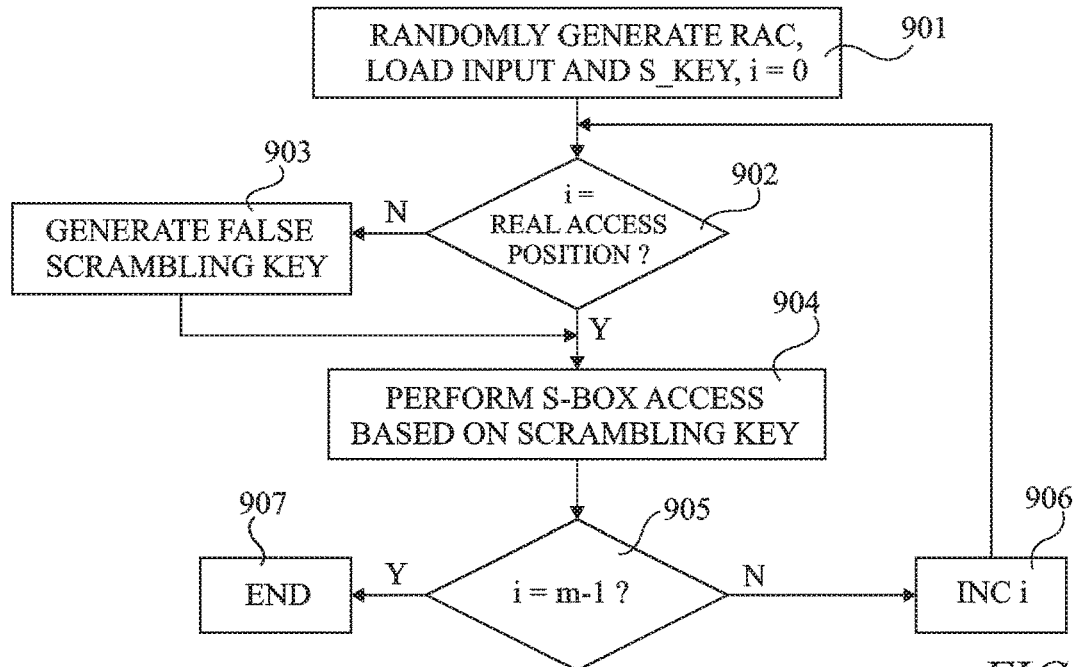
FIG. 9 is a flow diagram representing operations in a method of performing an S-box access according to an example embodiment of the present disclosure.

FIG. 9 is a flow diagram illustrating operations in a method of performing S-box access operations according to an example embodiment of the present disclosure, and using the processing system of FIG. 8.

In an operation 901, the value RAC is randomly generated, for example based on a random value provided by the generator 812. This value is for example stored in the RAM 808. Furthermore, the real scrambling key S_KEY and one or more input values INPUT are for example loaded into the working memory of the processing device 802, the working memory for example corresponding to the RAM 808. The input values are for example the results, stored to the RAM 808, of a previous operation performed by the processing device 802 involving a secret key. Furthermore, a variable i is stored in the RAM 808 and is initialized to 0.

In an operation 902, it is determined whether the variable i is equal to the position of the real access. The position of the real access is for example determined based on the values of RAC, NFC and NF as described above. If the variable i is not equal to the real position, in an operation 903, one or more false scrambling keys are generated by the processing device 802. For example, each false key is derived by the processing device 802 from the real key or generated based on one or more random values provided by the random number generator 812. After operation 903, or after operation 902 in the case that i is equal to the real position in operation 902, the next operation is 904.

In operation 904, the processing device 802 performs a set of one or more S-box accesses based on the scrambling key, which is either the real scrambling key S_KEY, or a false scrambling key if one was generated in operation 903. Each set of one or more S-box accesses is for example performed by addressing one or more non-volatile memories, such as the memory 806, which for example stores a lookup table corresponding to the scrambled S-box. The result of each S-box access is stored to memory, such as to the RAM 808.

In an operation 905, it is determined whether i is equal to m−1. If not, the variable i is incremented in an operation 906, and then the operations 902 to 905 are repeated based on the new value of i. Once i is equal to m−1, the method ends in an operation 907. For example, in the operation 907, the result of the real set of one or more S-box accesses is selected to be used in the cryptographic algorithm, based on the random values RAC and NFC. For example, the processing device 802 selects in the RAM 808, based on the values of the random values RAC and NFC, an address corresponding to the storage location of the result of the real substitution operation.

Figure 10:
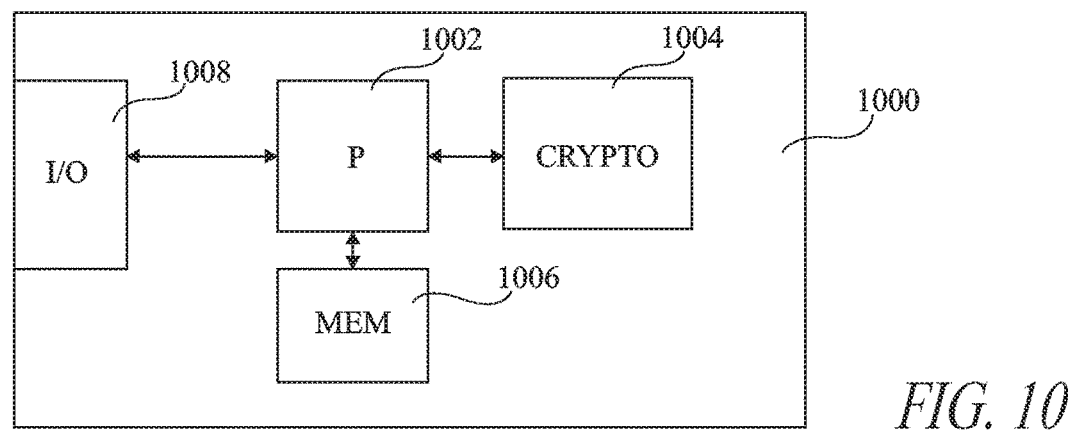
FIG. 10 schematically illustrates a cryptographic device according to an example embodiment of the present disclosure.

FIG. 10 schematically illustrates a cryptographic device 1000 according to an example embodiment.

The device 1000 for example comprises a processing device 1002 corresponding to the host processor of the cryptographic device 1000. The processing device 1002 is for example in communication with a cryptographic circuit 1004, which for example corresponds to the circuit 300 of FIG. 3A, 4 or 6A, or to some or all of the components of the processing system 800 of FIG. 8. The cryptographic device 1000 also for example comprises a memory (MEM) 1006 and an input/output interface (I/O) 1008 in communication with processing device 1002.

The device 1000 for example corresponds to an integrated circuit card (often known as a "smart card"), portable electronics device or other type of electronics device in which a cryptographic function is to be realized. In some embodiments, the input/output interface 1008 may correspond to an NFC (near-field communication) interface.

An advantage of the embodiments described herein is that the discovery of a secret key manipulated during substitution operations of a cryptographic algorithm using side channel methods can be rendered considerably more difficult. Indeed, by performing dummy S-box accesses based on false scrambling keys, a dissymmetry of the leakages is created during each real S-box access, and it becomes very difficult for a meaningful correlation to be determined between side channel signals during the S-box accesses and the value of the secret key.

Furthermore, by using a same set of false scrambling keys for a given secret key, this can lead to the generation of misleading information regarding the key value on the side channels. Indeed, a given false scrambling key used several times for a same secret key can be mistaken for genuine S-box accesses performed based on a ghost key different to the real key. With several different scrambling keys, the number of different ghost keys that will appear to have good correlations can be relatively high, and significantly higher than in the case that a fake secret key and/or fake message is used.

In an embodiment, an advantage of the hardware implementation of FIGS. 3A and 6B is that switching between dummy and real S-box accesses can be performed relatively rapidly, leading to a relatively small time overhead for the additional S-box accesses.

Having thus described at least one illustrative embodiment, various alterations, modifications and improvements will readily occur to those skilled in the art. For example, it will be apparent to those skilled in the art that the circuit of FIG. 3B implementing the key generator is merely one example, and that many alternative implementations would be possible.

Furthermore, while embodiments have been described in which each set of substitution operations is a single substitution operation or an entire cryptographic algorithm, embodiments of the present disclosure could be applied at a different level. For example, embodiments could be applied for rounds of the DES encryption algorithm, a series of fake rounds being performed for each real round to be executed.

Furthermore, while embodiments have been described based on a single S-box, certain cryptographic algorithms, such as DES, use a plurality of S-boxes in parallel. The embodiments described herein could also be applied to each of a plurality of S-boxes operating in parallel.

Furthermore, it will be apparent to those skilled in the art that the various features described in relation with the embodiments could be combined, in alternative embodiments, in any combination. For example, it would be possible to implement the S-box access method of the present disclosure using a combination of hardware and software.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   executing, using a cryptographic circuit, a cryptographic process, the cryptographic process including a plurality of sets of substitution operations executed using one or more scrambled substitution tables; and
   protecting the cryptographic circuit during execution of the cryptographic process, the executing and protecting including performing, for each of the plurality of sets of substitution operations of the cryptographic process, a series of sets of one or more substitution operations of which:
   one set of the series is a real set of one or more substitution operations defined by the cryptographic process, the performing the real set of one or more substitution operations including accessing a scrambled substitution table of the one or more scrambling tables using input data generated by:
   performing an operation on a message and a secret key; and
   modifying a result of the operation performed on the message and the secret key using a real scrambling key; and
   one or more other sets of the series are dummy sets of one or more substitution operations, each dummy set of one or more substitution operations including accessing a scrambled substitution table of the one or more scrambled substitution tables using input data generated using respective false scrambling keys different from the real scrambling key.

2. The method of claim 1, wherein a position of the real set of one or more substitution operations in each series is selected randomly based on a first random value.

3. The method of claim 2, comprising, for each series of sets of one or more substitution operations, storing respective output values of the series, and selecting an output value corresponding to said real set of one or more substitution operations based on said first random value.

4. The method of claim 1, wherein each set of one or more substitution operations comprises addressing a memory location of a memory based on input data and reading a data value at said memory location to provide an output data value.

5. The method of claim 1, wherein:
the cryptographic process is based on the secret key;
each series of sets of one or more substitution operations comprises m−1 dummy sets of one or more substitution operations, where m is an integer fixed at a value equal to or greater than 2, or selected randomly; and
for a given key, a same group of false scrambling keys is applied during the corresponding m−1 dummy sets of one or more substitution operations.

6. The method of claim 1, wherein performing each set of one or more substitution operations in said series comprises executing the cryptographic process based on a same input message and a same secret key.

7. The method of claim 1, wherein different scrambling keys applied during each of said dummy sets of one or more substitution operations are selected randomly.

8. The method of claim 1, wherein different scrambling keys applied during each of said dummy sets of one or more substitution operations are generated by a shift register receiving at its input the real scrambling key.

9. The method of claim 1, wherein a number of dummy sets of one or more substitution operations performed in each series is selected randomly.

10. A non-transitory computer-readable medium having contents which cause a processing device to implement a method, the method comprising:
executing substitution operations of a cryptographic process based on one or more scrambled substitution tables; and
protecting the processing device during execution of the cryptographic process, the executing and protecting including:
performing, for each set of one or more substitution operations of the cryptographic process, a series of sets of one or more substitution operations of which:
one set of the series is a real set of one or more substitution operations defined by the cryptographic process, the performing the real set of one or more substitution operations including accessing a scrambled substitution table of the one or more scrambled substitution tables using input data generated by:
performing an operation on a message and a secret key; and
modifying a result of the operation performed on the message and the secret key using a real scrambling key; and
one or more other sets of the series are dummy sets of one or more substitution operations, each dummy set of one or more substitution operations including accessing a scrambled substitution table of the one or more substitution tables using input data generated using respective false scrambling keys different from the real scrambling key.

11. The non-transitory computer-readable medium of claim 10 wherein a position of the real set of one or more substitution operations in each series is selected randomly based on a first random value.

12. The non-transitory computer-readable medium of claim 11 wherein the method comprises, for each series of sets of one or more substitution operations, storing respective output values of the series, and selecting an output value corresponding to said real set of one or more substitution operations based on said first random value.

13. The non-transitory computer-readable medium of claim 10 wherein each set of one or more substitution operations comprises addressing a memory location of a memory based on input data and reading a data value at said memory location to provide an output data value.

14. The non-transitory computer-readable medium of claim 10 wherein:
the cryptographic process is based on the secret key;
each series of sets of one or more substitution operations comprises m−1 dummy sets of one or more substitution operations, where m is an integer fixed at a value equal to or greater than 2, or selected randomly; and
for a given key, a same group of false scrambling keys is applied during the corresponding m−1 dummy sets of one or more substitution operations.

15. The non-transitory computer-readable medium of claim 10 wherein different scrambling keys applied during each of said dummy sets of one or more substitution operations are selected randomly.

16. The non-transitory computer-readable medium of claim 10 wherein different scrambling keys applied during each of said dummy sets of one or more substitution operations are generated by a shift register receiving at its input the real scrambling key.

17. The non-transitory computer-readable medium of claim 10 wherein a number of dummy sets of one or more substitution operations performed in each series is selected randomly.

18. A cryptographic device, comprising:
a memory circuit, which, in operation, stores one or more scrambled substitution tables to implement substitution operations of a cryptographic process; and
one or more circuits, which, in operation, execute the cryptographic process and protect the cryptographic device during execution of the cryptographic process, the executing and protecting including, for each set of one or more substitution operations of the cryptographic process, performing a series of sets of one or more substitution operations using a stored scrambled substitution table of the one or more stored scrambled substitution tables, each series of sets of one or more substitution operations comprising:
a real set of one or more substitution operations defined by the cryptographic process, the performing the real set of one or more substitution operations including accessing the scrambled substitution table using input data venerated by:
performing an operation on a message and a secret key; and
modifying a result of the operations using a real scrambling key; and
one or more dummy sets of one or more substitution operations, each dummy set of one or more substitution operations including accessing the scrambled substitution table using input data generated using respective false scrambling keys different from the real scrambling key.

19. The cryptographic device of claim 18, comprising a random number generator, which, in operation, generates, for each of said series of sets of one or more substitution operations, a random value, wherein the one or more circuits randomly select a position of the real substitution operation in the series based on the random value.

20. The cryptographic device of claim 19, comprising:
an input register, which, in operation, stores input values;
a scrambler, which, in operation, modifies stored input values based on a scrambling key; and
a key generator, which, in operation, generates scrambling keys for each substitution operation of said series based on the real scrambling key.

21. The cryptographic device of claim 20 wherein the key generator comprises a shift register, which, in operation, generates said scrambling key by shifting said real scrambling key.

22. The cryptographic device of claim 18, wherein the one or more circuits comprise one or more processing devices under control of instructions stored in an instruction memory to select, for each set of one or more substitution operations of each series, either to implement the real set of one or more substitution operations by using the real scrambling key, or to implement a dummy set of one or more substitution operations by using one of said false scrambling keys.

23. A system, comprising:
one or more processing cores; and
cryptographic circuitry coupled to the one or more processing cores, wherein the cryptographic circuitry, in operation,
executes a cryptographic process which uses a plurality of substitution tables; and
protects the cryptographic circuitry during the execution of the cryptographic process, the executing and protecting including performing, for each set of one or more substitution operations of the cryptographic process, a series of sets of one or more substitution operations of which:
one set of the series is a real set of one or more substitution operations defined by the cryptographic process, the performing the real set of one or more substitution operations including accessing a scrambled substitution table using input data generated by:
performing an operation on a message and a secret key; and
modifying a result of the operation using a real scrambling key; and
one or more other sets of the series are dummy sets of one or more substitution operations, each dummy set of one or more substitution operations including accessing the scrambled substitution table using input data generated using respective false scrambling keys different from the real scrambling key.

24. The system of claim 23 wherein a position of the real set of substitution operations in each series is selected randomly based on a first random value.

25. The system of claim 23 wherein the cryptographic process is related to a function of the one or more processing cores.

* * * * *

UNITED STATES PATENT AND TRADEMARK OFFICE
CERTIFICATE OF CORRECTION

| | |
|---|---|
| PATENT NO. | : 11,258,579 B2 |
| APPLICATION NO. | : 16/281887 |
| DATED | : February 22, 2022 |
| INVENTOR(S) | : Daniele Fronte et al. |

It is certified that error appears in the above-identified patent and that said Letters Patent is hereby corrected as shown below:

In the Claims

Column 16, Claim 18, Line 61:
"data venerated by:" should read: -- data generated by: --.

Column 16, Claim 18, Line 64:
"the operations" should read: -- the operation --.

Signed and Sealed this
Thirty-first Day of May, 2022

Katherine Kelly Vidal
*Director of the United States Patent and Trademark Office*